March 4, 1952 C. L. HUFFMAN 2,588,241
CONNECTING MEMBER FOR LOOMS
Filed April 11, 1949 2 SHEETS—SHEET 1
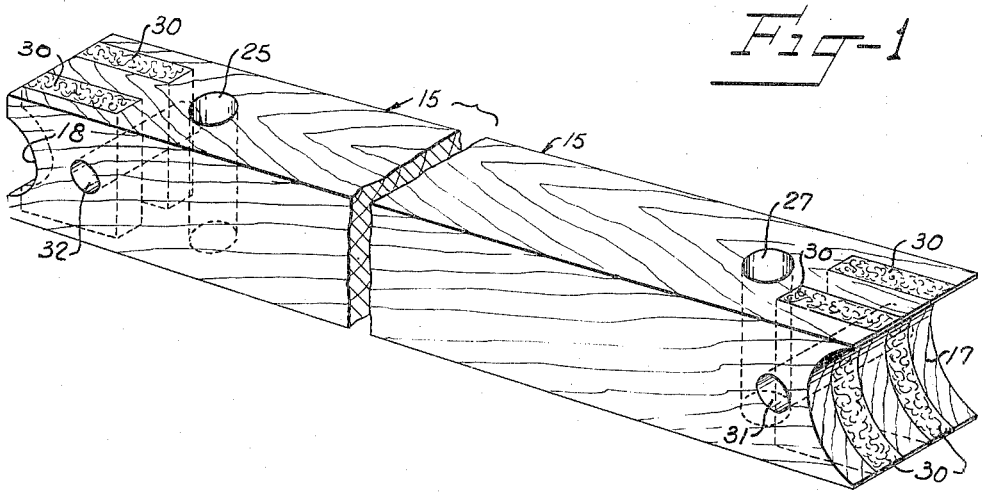
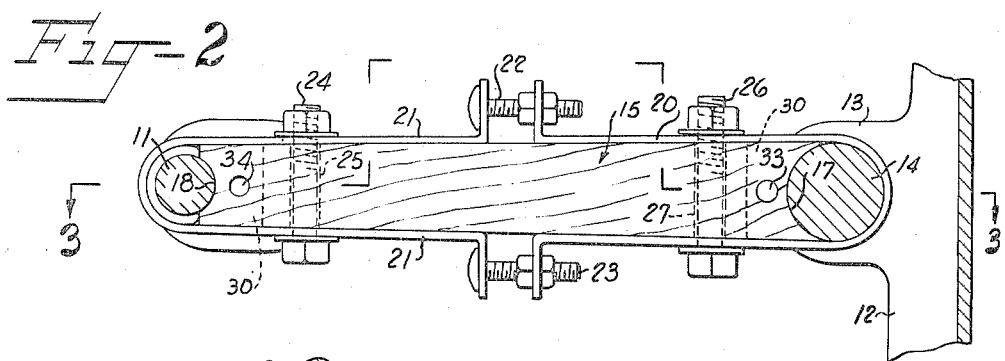
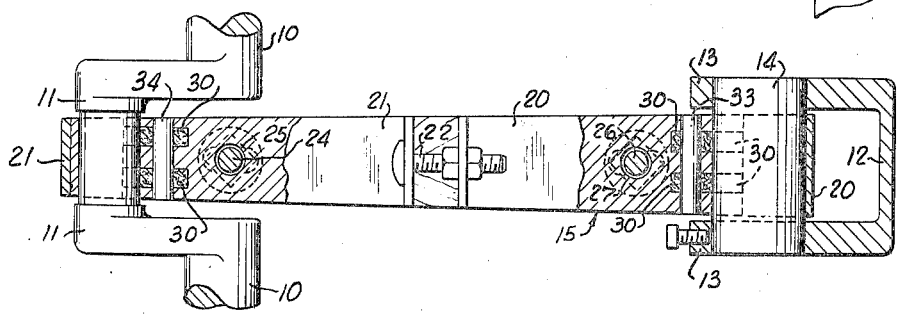
Coy L. Huffman
INVENTOR.
BY
ATTORNEY.

Coy L. Huffman,
INVENTOR.

BY  *Paul L Eaton*

ATTORNEY.

UNITED STATES PATENT OFFICE 2,588,241

CONNECTING MEMBER FOR LOOMS

Coy Lester Huffman, Greenville, S. C.

Application April 11, 1949, Serial No. 86,707

2 Claims. (Cl. 74—579)

This invention relates to a connecting member for looms and especially to connecting members such as a pitman rod connector which connects the crankshaft of the loom with the sword of the loom and also to a lug strap connector which is disposed between the lug strap which is associated with a picker and the pick shaft lever which imparts a quick motion to the picker stick to expel the shuttle from the shuttle box, such as shown in my Patent Number 2,430,226 of November 4, 1947.

In looms there is usually provided a crankshaft having two crank throws thereon with a pitman rod pivotally connected to each crank throw and having their other ends pivotally connected to the swords which carry the lay of the loom. The rotation of the crank shaft imparts reciprocatory motion to the pitman rods and since each end of a pitman rod has a semi-circular bearing portion thereon which is engaged by the crank throw of the crankshaft and the connecting pin of the lay of the loom, it often happens that the semi-circular bearing surfaces of these pitman members are marred and split and easily worn as they are usually made of wood.

It is an object of this invention to reinforce these semi-circular bearing portions on a pitman rod for a loom by placing compressed fibrous inserts therein to strengthen the ends of the pitman rod against splitting and also to retard wearing by frictional contact with the crank throw and the pitman rod pins.

Also in lug strap connectors which are usually made of wood, the transverse portion of the pick lever is prone to strike against the end of the wooden lug strap connector and split and mar the same. Also, when a picker stick is oscillated to expel a shuttle from the shuttle box of the loom and this movement imparted by the lug strap is suddenly stopped, the picker stick, due to its momentum, strikes against the outer end of the lug strap connector tending to wear and split and mar the same. By providing the two ends of the lug strap connector with imbedded compressed fibrous sheets of material the ends of the lug strap connector are greatly strengthened and splitting and marring is therefore greatly retarded, if not completely prevented, by the reinforcing of the ends of the lug strap connector.

It is therefore an object of this invention to provide in a wooden connecting member used in looms means for reinforcing the ends of the connectors by forming spaced slots therein and imbedding in these slots sheets of suitable compressed fibrous material to thus present a better wearing surface and one which is less likely to split or become marred from blows imparted thereto.

Some of the objects of the invention having been stated, other objects will appear as the description proceeds, when taken in connection with the accompanying drawings, in which—

Figure 1 is an isometric view of an improved pitman rod for looms;

Figure 2 is an elevation partly in section and showing the pitman rod attached to the crankshaft and sword of a loom;

Figure 3 is a sectional plan view taken substantially along the line 3—3 in Figure 2;

Figure 5:
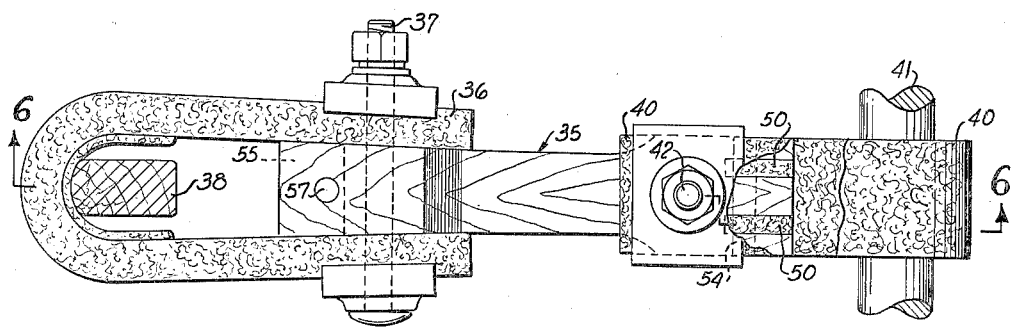
Figure 5 is a plan view showing a portion broken away and showing a picker stick in section of the connector assembled with a lug strap with a picker strap attached thereto.

Referring more specifically to the drawings the numeral 10 indicates a conventional crankshaft of the loom which has a pair of crank throws 11 thereon and the loom is also equipped with a pair of swords 12 to which a suitable lay, not shown, is secured and these swords 12 have a pair of spaced lugs 13 having a pin 14 therein and it is between pin 14 and crank throw 11 that a pitman rod is disposed. This pitman rod usually comprises a piece of wood 15 having a semi-circular cavity 17 in one of its ends for fitting against the pin 14 and a semi-circular cavity 18 in its other end for fitting against the crank throw 11.

The connecting rod 15 is usually connected to the pin 14 and the crank throw 11 by means of strap iron U-shaped members 20 and 21 secured together at their proximate ends by means of bolts 22 and 23. Also a suitable bolt 24 penetrates a hole 25 in one end of the lug strap and a bolt 26 penetrates a hole 27 in the other end of the pitman rod.

The structure so far described is conventional and the departure from the conventional in this type of pitman rod comprises milling a plurality of slots in each end of the pitman rod 15 and inserting therein compressed sheets of fibrous material 30 and gluing them in position and then to insure that they will be held in proper position suitable holes 31 and 32 are provided in which pins 33 and 34 are disposed to thus provide both of the end bearing surfaces of the pitman rod 15 with fibrous layers interspersed between the wood to thus present a better wearing surface and by impregnating the sheets 30 if desired with a suitable lubricant a self lubricating bearing can be provided and the bearing will wear much longer than plain wooden ends heretofore employed and which ends are also greatly reinforced against splitting which is a natural occurrence in wooden pitman rods of this type.

Figure 6:
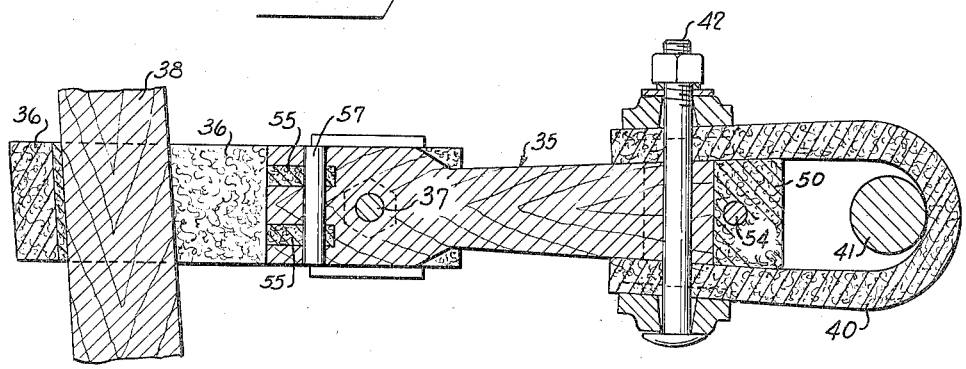
Figure 6 is a sectional view taken along the line 6—6 in Figure 5.
Figure 4:
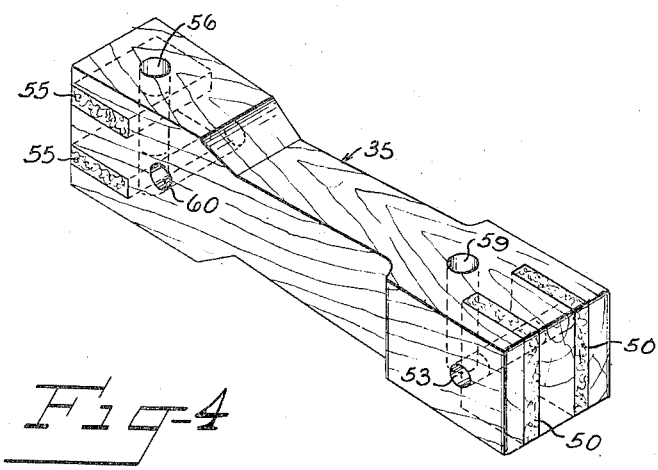
Figure 4 is an isometric view of my improved lug strap connector.

Now as for lug straps, this type of lug straps is shown in my above referred to patent. A lug strap connector is indicated at 35 which has a lug strap 36 secured to one end thereof by any suitable means such as a bolt 37 and this lug strap surrounds a conventional picker stick 38. The other end of the lug strap 35 has a suitable U-shaped shorter lug strap 40 which encircles the transverse bearing portion 41 of the lever arm extending from a pick shaft as shown in my aforesaid patent. The lug strap 40 is secured to the other end of the lug strap connector 35 by any suitable means such as a bolt 42. The structure thus far described is conventional but due to the fact that the picker stick 38 impinges against the left-hand end of the lug strap connector in Figures 5 and 6 to mar the same and sometimes split the same and also due to the fact that oscillation of the lever on the pick shaft will cause the transverse bearing portion 41 to strike against the right-hand end of the lug strap connector as shown in Figures 5 and 6 very often that end of the lug strap connector is marred and damaged and sometimes split by the impact of these blows. Now in order to overcome this difficulty, I have provided a plurality of slots in the two ends of the lug strap connector into which I glue suitable compressed fibrous sheets 50 and which are in slots spaced from each other to present a part wooden surface on the end thereof and a part fibrous material surface. In order to insure that these sheets 50 will retain their position, a suitable transverse hole 53 is provided through which a pin 54 is passed and glued in position. Also at the other end of the lug strap connector suitable spaced slots are provided in which the impregnated compressed fibrous sheets 55 are glued and a suitable hole 56 is provided through these sheets and through the end of the lug strap connector and a pin 57 is glued in position to thus greatly strengthen that end of the lug strap connector.

The holes 59 and 60 respectively are provided for reception of the bolts 42 and 37 respectively.

In the drawings and specification there has been set forth a preferred embodiment of the invention, and although specific terms are employed, they are used in a generic and descriptive sense only, and not for purposes of limitation, the scope of the invention being defined in the claims.

I claim:

1. An improvement in a wooden pitman rod for looms adapted to connect a crank throw on a crank shaft with a sword pin and having substantially semi-circular bearing cavities in each end thereof and having a pair of U-shaped members disposed over the ends of the pitman rod for encircling the crank throw and the sword pin and having out-turned ends penetrated by bolts for securing the U-shaped members over the ends of the pitman rod and the sword pin, said improvement comprising the ends of the pitman rod having a plurality of spaced slots in each end thereof and extending longitudinally of the pitman rod and each slot having a sheet of fibrous material fitting tightly therein and adhesively secured therein, each end of the pitman rod having a transverse bore therein which penetrates said sheets of fibrous material and a confining pin tightly secured in each of said bores and also penetrating the bores in the sheets of fibrous material.

2. An improvement in a connecting member for connecting two moving parts of a loom together and having bores spaced from the ends thereof for mounting a fitting, said improvement comprising the two ends of the connecting member having a plurality of longitudinally extending spaced grooves therein extending from one side of the connecting member to the other and each slot having a sheet of fibrous material fitted therein and each end of the connecting member having a transverse bore extending therethrough and through the fibrous sheets and a pin tightly mounted in each of the last named bores.

COY LESTER HUFFMAN.

REFERENCES CITED

The following references are of record in the file of this patent:

UNITED STATES PATENTS

| Number | Name | Date |
|---|---|---|
| 183,080 | Sweeny | Oct. 10, 1876 |
| 191,489 | Sweeny | May 29, 1877 |
| 583,193 | Davis | May 25, 1897 |
| 1,235,839 | Poe | Aug. 7, 1917 |
| 1,280,261 | McFarland | Oct. 1, 1918 |
| 1,442,445 | Romano | Jan. 16, 1923 |
| 2,359,669 | Oliver | Oct. 3, 1944 |